United States Patent
Drinkard (10) Patent No.: US 12,538,908 B2
(45) Date of Patent: Feb. 3, 2026

(54) RETRACTABLE BARB FISH HOOK

(71) Applicant: Tim Drinkard, Oskaloosa, KS (US)

(72) Inventor: Tim Drinkard, Oskaloosa, KS (US)

( * ) Notice: Subject to any disclaimer, the term of this patent is extended or adjusted under 35 U.S.C. 154(b) by 68 days.

(21) Appl. No.: 18/058,514

(22) Filed: Nov. 23, 2022

(65) Prior Publication Data

US 2023/0157266 A1 May 25, 2023

Related U.S. Application Data (60) Provisional application No. 63/264,479, filed on Nov. 23, 2021.

(51) Int. Cl.
*A01K 83/00* (2006.01)
*A01K 97/18* (2006.01)

(52) U.S. Cl.
CPC .............. *A01K 83/00* (2013.01); *A01K 97/18* (2013.01)

(58) Field of Classification Search
CPC ....... A01K 97/18; A01K 83/069; A01K 97/24
USPC .......... 43/43.16, 43.4, 44.2, 44.8, 53.5, 17.2
See application file for complete search history.

(56) References Cited

U.S. PATENT DOCUMENTS

| | | | | |
|---|---|---|---|---|
| 1,558,295 A | * | 10/1925 | Sawyers | A01K 83/00 43/44.83 |
| 2,217,928 A | * | 10/1940 | Ward | A01K 83/00 43/53.5 |
| 2,851,817 A | * | 9/1958 | Faustich, Jr. | A01K 83/02 43/44.82 |
| 3,624,690 A | * | 11/1971 | Ashley | A01K 83/04 43/53.5 |
| 4,126,957 A | * | 11/1978 | Randall | A01K 83/00 43/43.16 |
| 4,858,371 A | * | 8/1989 | Preiser | A01K 83/00 43/43.16 |
| 4,922,649 A | * | 5/1990 | Mitchell | A01K 83/00 43/43.4 |
| 4,998,375 A | | 3/1991 | Mitchell | |
| 5,356,388 A | | 10/1994 | Sepetka et al. | |
| 5,367,818 A | | 11/1994 | Aduana | |
| 5,377,442 A | | 1/1995 | Gariglio | |
| 5,491,925 A | * | 2/1996 | Carpenter | A01K 83/02 43/37 |
| 5,526,602 A | | 6/1996 | Day, Sr. | |
| 5,884,428 A | * | 3/1999 | Shelton | A01K 83/00 43/4.5 |
| 5,956,886 A | | 9/1999 | Choate | |
| 6,240,672 B1 | | 6/2001 | Huppert | |
| 6,739,085 B1 | * | 5/2004 | Burczynski | A01K 83/00 43/43.4 |
| 7,254,917 B2 | * | 8/2007 | Brickett | A01K 91/06 43/43.16 |
| 7,743,549 B2 | | 6/2010 | Troutman | |
| 8,002,714 B2 | | 8/2011 | Bakos | |
| 8,539,710 B2 | | 9/2013 | Johnson | |
| 8,540,676 B2 | | 9/2013 | Geist et al. | |
| 8,826,586 B1 | * | 9/2014 | Kusmich | A01K 83/06 43/44.4 |
| 9,003,690 B1 | | 4/2015 | Rye | |
| 9,636,485 B2 | | 5/2017 | Simpson et al. | |

(Continued)

*Primary Examiner* — William L Gmoser
(74) *Attorney, Agent, or Firm* — Stinson LLP (57) ABSTRACT

A retractable barb fish hook and associated components and methods. The fish hook can include a body and an insert. The insert is movable relative to the body to deform a barb to facilitate removal of the hook.

13 Claims, 7 Drawing Sheets

(56) References Cited

U.S. PATENT DOCUMENTS

| | | |
|---|---|---|
| 11,819,011 B1 * | 11/2023 | Robinson ............... A01K 83/00 |
| 2007/0225651 A1 | 9/2007 | Rosenberg et al. |
| 2007/0250012 A1 | 10/2007 | Lu et al. |
| 2009/0119973 A1 | 5/2009 | Moffitt |
| 2012/0036762 A1 | 2/2012 | Veith et al. |
| 2013/0318859 A1 | 12/2013 | Kusmerz et al. |
| 2014/0237890 A1 | 8/2014 | Borenstein |
| 2015/0099969 A1 | 4/2015 | Wall |
| 2016/0045715 A1 | 2/2016 | Galgano et al. |
| 2016/0205908 A1 | 7/2016 | Stanford |
| 2016/0338330 A1 | 11/2016 | Bendel |
| 2017/0188560 A1 | 7/2017 | Graham |
| 2018/0000058 A1 | 1/2018 | Jarboe, Jr. |

\* cited by examiner

RETRACTABLE BARB FISH HOOK

CROSS-REFERENCE TO RELATED APPLICATION

This application claims priority to U.S. Provisional Patent Application Ser. No. 63/264,479, filed Nov. 23, 2021, the entirety of which is hereby incorporated by reference.

FIELD

This disclosure relates generally to fishing hooks and more specifically to fishing hook apparatus with a barb that can be retracted to facilitate removal from a caught fish.

BACKGROUND

Fish hooks generally include one or more barbed ends. One primary purpose of the barbed end of a fish hook is to catch onto tissues in a mouth region of a fish (or another creature to be caught) after the fish has swallowed the hook together with any bait attached thereto. With the hook caught in the fish, a user (e.g., a fisher) may retrieve the caught fish by reeling in a fishing line secured to the hook. After the user has retrieved the caught fish, the user must remove the fish from the line, which may be accomplished by immediately removing the hook from the fish or by cutting the line and subsequently removing the hook after the line is severed. The presence of the barb on the hook can slow down the process of removing the hook from the fish and may lead to injuries—either to the fish or to the user—if the barb gets caught in flesh and must be torn out. The present invention relates to a hook design that is intended to improve the hook removal process by permitting the user to release and retract the barb of the hook so that the hook can be more easily removed from flesh if the barb becomes caught therein.

SUMMARY

In one aspect, a retractable barb fish hook includes a body and an insert. The body includes a hollow interior, a shank end with a shank opening, and a hook end with a barb opening. The insert includes a wire and an eye. The wire has a connecting end and a barb end, and the barb end defines a barb. The eye has a receiving portion and a base that is connected to the connecting end of the wire. The receiving portion and the base of the eye may rotate with respect to the barb end of the wire. The wire extends in the hollow interior of the body such that the barb protrudes from the barb opening at a skew angle relative to the hook end. At least a portion of the barb end of the wire may be retracted into the interior of the body by moving the eye in an outward direction relative to the shank opening and exerting a force on the wire sufficient to deform the barb.

In another aspect, a retractable barb fish hook includes a body and an insert. The body includes a shank end with a shank opening and a threaded portion, and a hook end with a barb opening. The insert includes a wire and an eye. The wire has a connecting end and a barb end, and the barb end defines a barb. The eye has a receiving portion and a base that may mate threadably with the threaded portion of the body. The wire is coupled to the base of the eye and extends in the body such that the barb protrudes from the barb opening at a skew angle relative to the hook end. The barb is exposed outside the barb opening when the base is threadably coupled to the threaded portion of the body.

In yet another aspect, a method of making a retractable barb fish hook includes the step of providing an elongate tube, an eye, and a flexible wire. The tube has a shank end with a shank opening and a distal end with a barb opening. The eye has a receiving portion and a base, and the wire has a proximal end and a distal end. The method further includes the steps of connecting the proximal end of the wire to the base of the eye; inserting the wire through the tube such that the distal end of the wire protrudes from the barb opening and the base of the eye is received in the shank opening; and securing the base of the eye to the sank end of the tube. The method may include an additional step of forming an arc in the tube near the distal end of the tube, or another additional step of forming a barb by bending the distal end of the wire.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
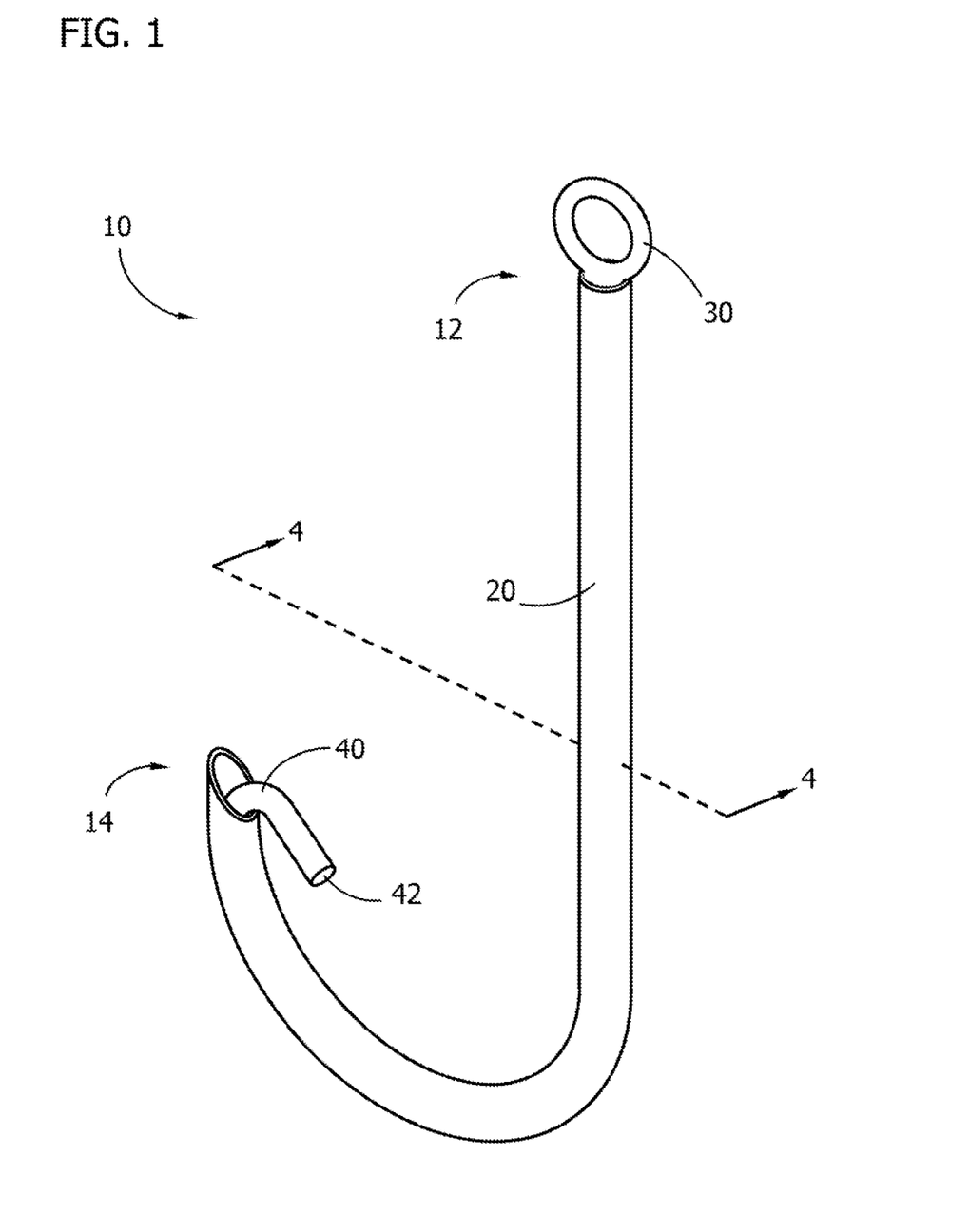
FIG. 1 is a perspective of a fish hook assembly of the present invention including a hook body, eye bolt, and wire.
Figure 2:
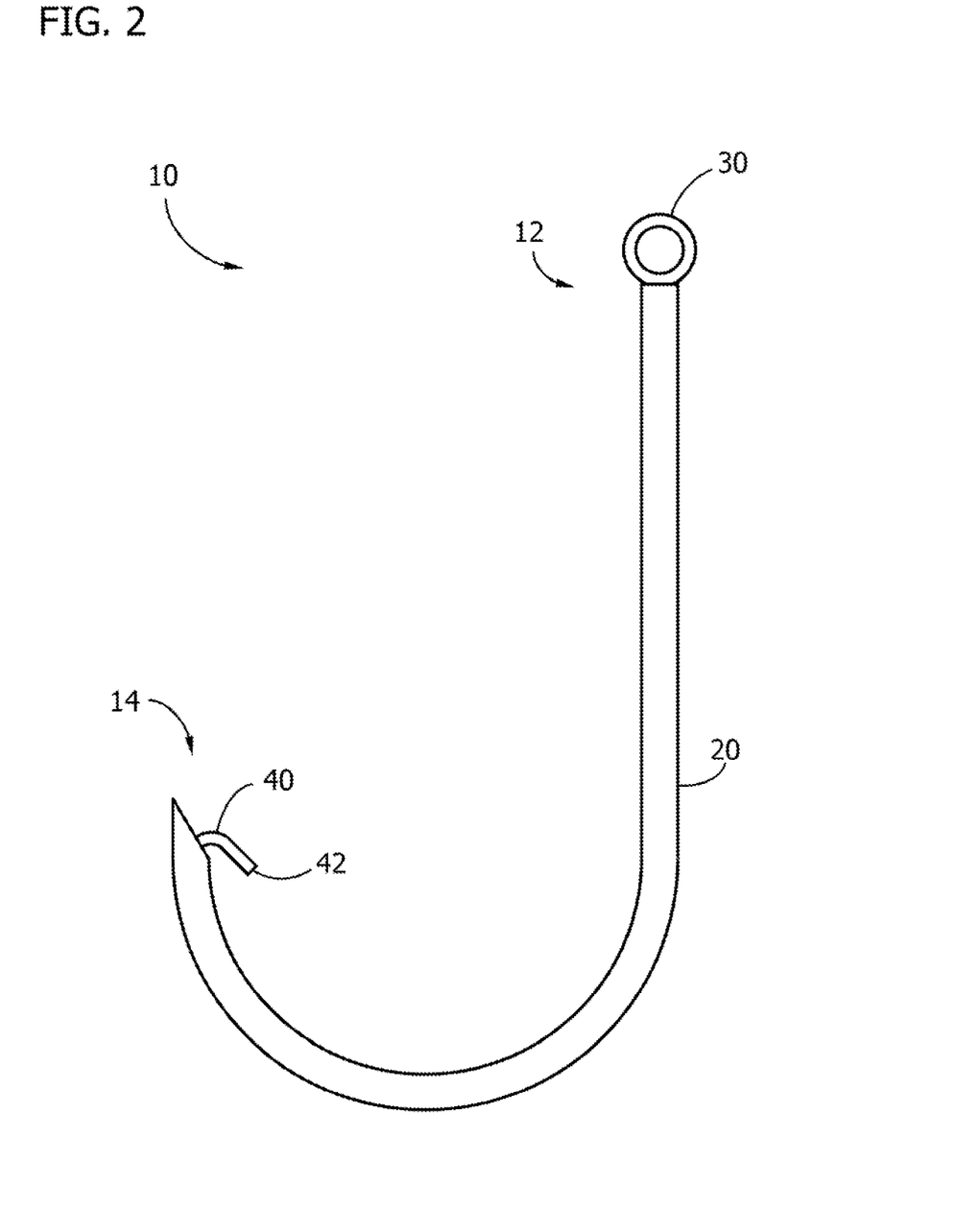
FIG. 2 is a side view of the fish hook assembly of FIG. 1.

Referring to FIGS. 1-4, a fish hook assembly of the present disclosure is indicated generally by reference number 10. As shown in FIG. 1, the fish hook assembly 10 includes a hook body 20, an eye bolt 30 (broadly, "eye"), and a wire 40. The fish hook assembly includes a shank region 12 located generally at a proximal end of the hook assembly where the eye bolt 30 can be installed, and a hook region 14 located generally at a distal end of the hook assembly 10 opposite the proximal end.

Figure 3:
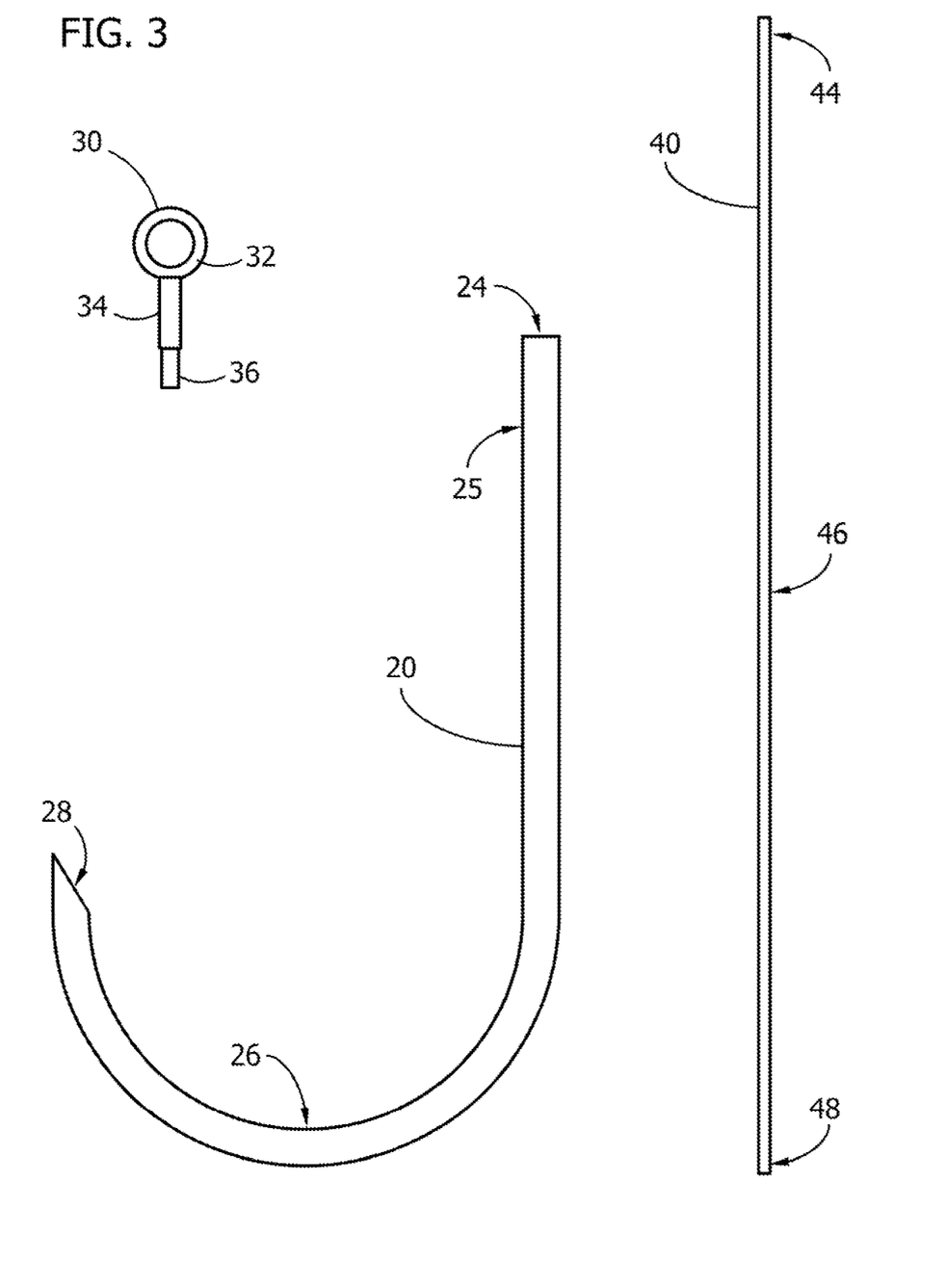
FIG. 3 is an exploded front view of the fish hook assembly of FIG. 1 with the eye bolt and the wire removed from the hook body.
Figure 4:
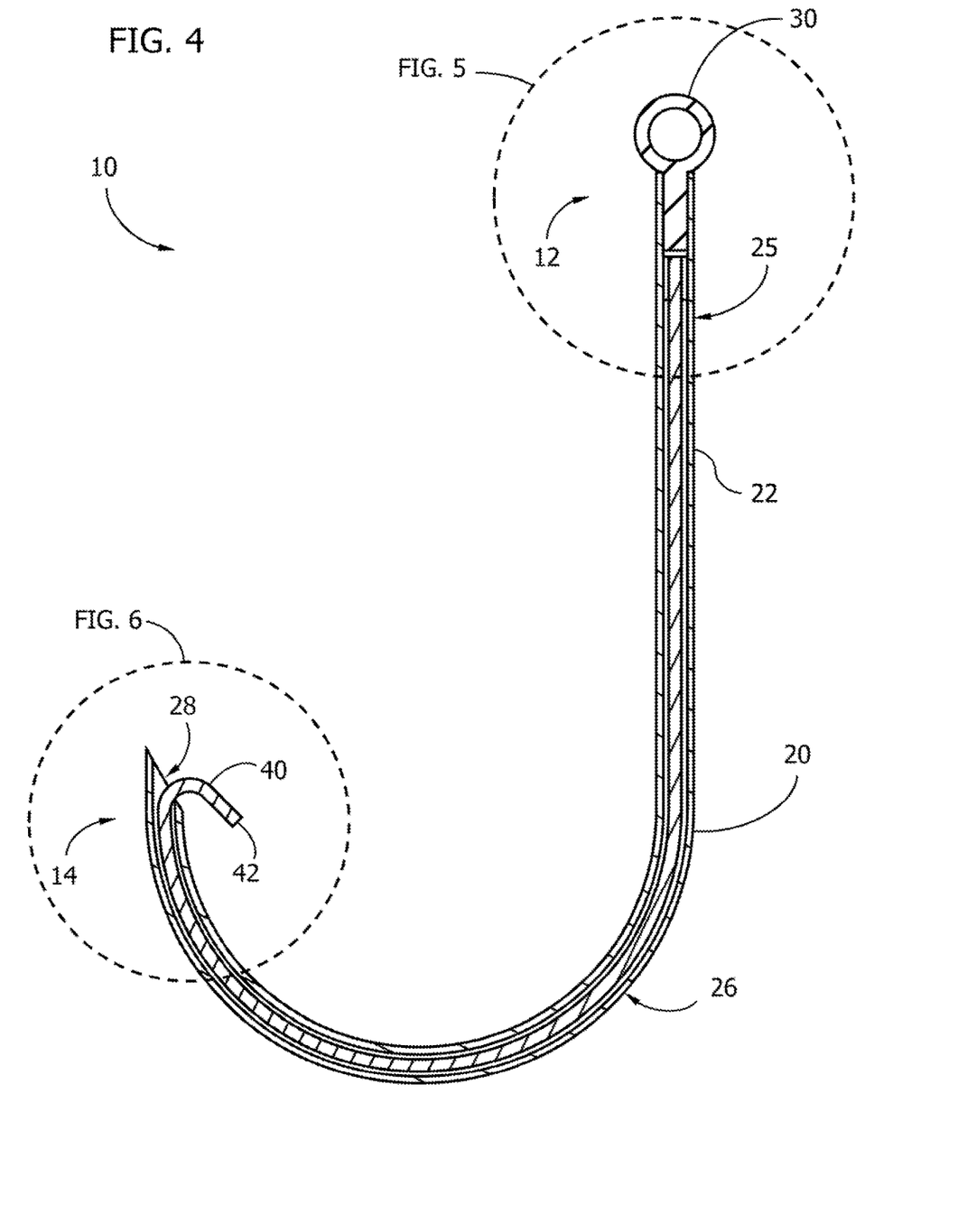
FIG. 4 is a section of the fish hook assembly taken through line 4-4 of FIG. 1.

As best shown in FIG. 4, the hook body 20 has a hollow, tubular wall 22 that defines a shank opening 24 at the proximal end of the body 20, a shank portion 25, a hook portion 26, and a barb opening 28 at the distal end of the body 20. The body wall 22 defines a passage 23 in the body 20 that extends from the shank opening 24 to the barb opening 28. Desirably, the passage 23 is wide enough to surround the wire 40 without restricting the movement thereof. In the embodiment shown in FIGS. 1-6, the shank portion 25 is generally straight and communicates with the hook portion 26; and the hook portion 26 has a generally semicircular or arcuate profile that is coincident with the shank portion 25.

Figure 5:
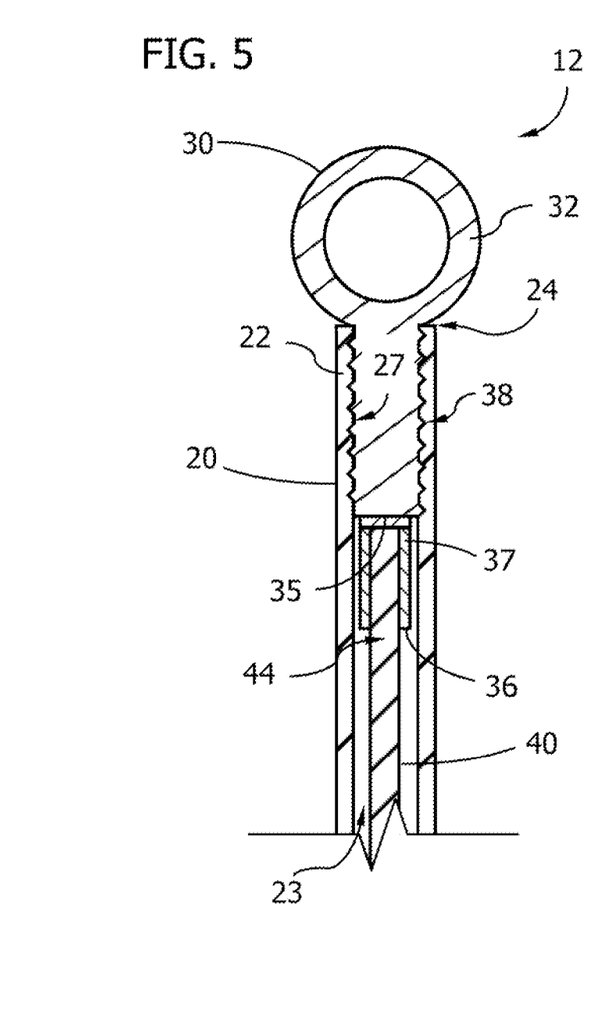
FIG. 5 is a fragmentary section of a shank region of the hook assembly of FIG. 4.

Now referring to FIG. 5, at the proximal end of the hook body 20 near shank opening 24, the tubular wall 22 includes a threaded interface 27. The threaded interface 27 is dimensioned to mate with a corresponding thread 38 on the eye bolt 30 to allow the eye bolt 30 to be releasably secured to the hook body 20.

Figure 6:
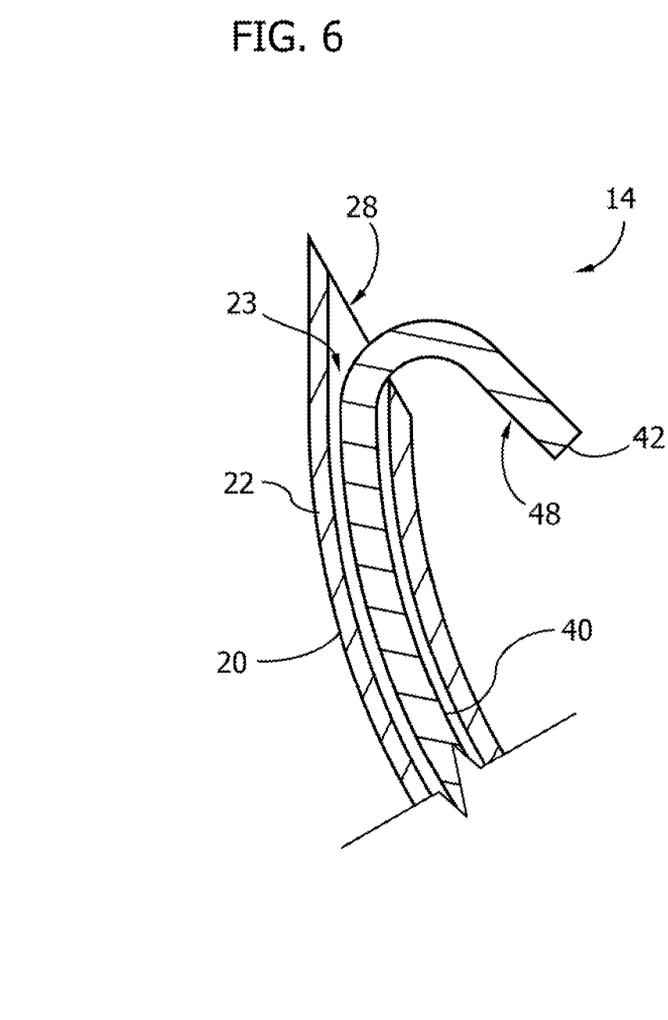
FIG. 6 is a fragmentary section of a hook region of the hook assembly of FIG. 4.

Referring to FIG. 6, at the distal end of the hook body 20, the barb opening 28 is oriented at an angle such that the barb opening 28 may generally face the shank portion 25. In some embodiments, the hook portion 26 of the hook body 20 may be formed by providing a straight tubular member such as a hypodermic needle and bending the member near one end of the tubular member (e.g., the beveled end of the needle). It is contemplated that the hook portion 26 may be formed before or after the wire 40 is inserted through the passage 23 of the hook body 20 as described herein.

Figure 7:
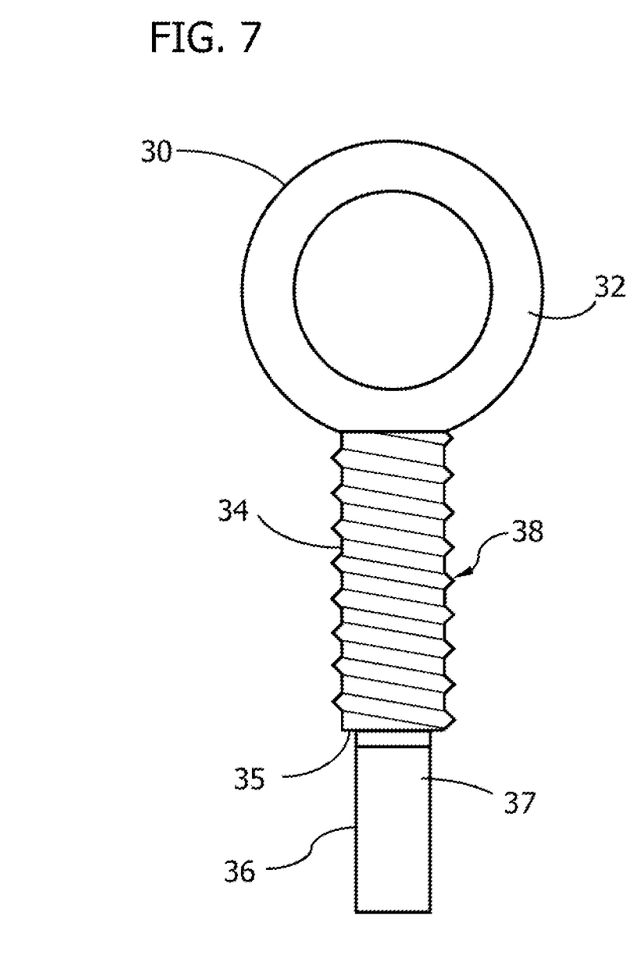
FIG. 7 is a side view of the eye bolt of the fish hook assembly of FIG. 1.

Referring now to FIGS. 3, 5, and 7, the eye bolt 30 includes an eye portion 32 (broadly, "receiving portion"), a base 34 adjacent the eye portion 32 at an upper end of the base, and a ferrule portion 36 adjacent the base 34 at a lower end 35 opposite the eye portion 32. In the illustrated embodiment, the eye bolt 30 is integrally formed, though in alternative embodiments, either the eye portion 32 or the ferrule portion 36 (or other components) can be formed separately and subsequently attached to a respective end of the base 34 without departing from the scope of the invention.

The eye portion 32 has a solid, annular shape and is dimensioned to receive a fishing line (not pictured) for use with fishing equipment such as a fishing rod (not pictured). The base 34 is generally cylindrical and has a helical thread 38 disposed about its perimeter. The thread 38 is dimensioned to mate with the threaded interface 27 in the shank opening 24 of the hook body 20 such that the eye bolt 30 may be releasably secured to the hook body 20. Although a threaded connection is shown in the illustrated embodiment, other embodiments may employ other ways for releasably securing the eye bolt 30 to the hook body 20, including pins or levers as non-limiting examples.

Referring to FIGS. 5 and 7, the ferrule portion 36 protrudes from the lower end 35 of the base 34 and includes a generally tubular wall 37 that is dimensioned to receive and secure a proximal portion of the wire 40 so that the barb 42 of wire 40 can be retracted during use of the hook assembly 10, as will described in greater detail herein. It will be appreciated that the ferrule portion 36 is no wider than the passage 23 of the hook body 20 to ensure that the eye bolt 30 can advance through the passage 23 (for example, when the eye bolt 30 is inserted or removed).

Now referring to FIGS. 1, 3, and 4-6, the wire 40 includes several outer strands that are twisted around a unitary core. In alternative embodiments, a suitable wire may have different characteristics, which could include without limitation a configuration with braided strands or a single strand. The wire 40 has a proximal portion 44, a central portion 46, and a distal portion 48. The distal portion 48 can be bent to define the barb 42 in the hook assembly 10, as described in greater detail herein. Referring to FIG. 6, the barb 42 is angled at approximately 45° relative to the barb opening 28, though the angle of the barb may vary substantially in other embodiments depending on the needs or preferences of the user, the physical characteristics of the fish to be caught, or other conditions pertinent to the use of the hook assembly 10. Now referring to FIG. 5, the outer diameter of the wire 40 generally corresponds with the dimensions of the wall 37 of the ferrule portion 36 such that the proximal portion 44 of the wire 40 can be received and secured by the ferrule portion.

As is best seen in FIG. 4, the wire 40 is dimensioned to extend through the passage 23 of the hook body 20 such that the barb 42 protrudes from the barb opening 28 when the proximal portion 44 is secured to the ferrule portion 36 of the eye bolt 30 and the eye bolt 30 is threadably received in the shank opening 24. When the proximal portion 44 of the wire 40 is secured to the ferrule portion 36 of the eye bolt 30, the proximal portion 44 moves in concert with the eye bolt 30. The central portion 46 of the wire 40 is configured to rotate internally as torque is applied, allowing the proximal portion 44 to rotate relative to the distal portion 48 or vice versa. As a non-limiting example, the user may be able to rotate the eye bolt 30 and proximal portion 44 of the wire 40 even while the distal portion 48 is incapable of rotating (e.g., if the barb 42 is lodged in the mouth of a fish or flesh of a user's hand).

Now referring to FIGS. 1-6, one contemplated manner of assembling and using the fish hook assembly 10 will be described as would be achieved by an ordinary user. As is best seen in FIGS. 3, 4, and 5, the user may insert the proximal portion 44 of the wire 40 into the ferrule 36 and clamp the ferrule wall 37 until the ferrule 36 securely retains the proximal portion 44. Then, the user may feed the distal portion 48 of the wire 40 into the shank opening 24 of the hook body 20 and through the passage 23. As is best seen in FIG. 5, the user may then fasten the eye bolt 30 to the hook body 20 by screwing the base 34 into the shank opening 24. As is best seen in FIG. 6, when the eye bolt 30 is fully fastened and the distal portion 48 of the wire 40 protrudes from the barb opening 28, the user may form the barb 42 by bending the distal portion 48 generally inward toward the shank portion 25 and the hook portion 26 at a desired angle. The user may subsequently prepare the fish hook assembly 10 for use by tying a fishing line around the eye portion 32 of the eye bolt 30 and/or attaching bait to the hook assembly, as non-limiting examples.

After the hook assembly 10 becomes lodged in an object (e.g., the mouth of a fish or the flesh of the user, not pictured), the user may perform a number of steps to retract the barb 4 to facilitate the removal of the hook assembly 10 from the object. Specifically, the user may unfasten the eye bolt 30 by rotating the eye bolt in its unfastening direction. The unfastening of the eye bolt 30 may cause the eye bolt and the proximal portion 44 of the wire 40 to rotate and travel upward relative to the hook body 20 and the distal portion 48, the rotation and upward motion individually and collectively resulting in an increase in tension in the central portion 46. The tension in the central portion 46 of the wire 40 subsequently causes the barb 42 to unbend and the distal portion 48 to recede into the hook body 20. In this manner, the barb 42 is retracted from the barb opening 28, and the user may remove the hook assembly 10 from the object without resistance caused by the barb 42. Desirably, the unthreading of the eye bolt 30 from the hook body 20 sufficiently pulls the wire to cause the barb to deform to permit easy removal of the hook. However, it will be appreciated that the user may need to further pull the eye bolt after unthreading is complete to sufficiently deform the barb.

As described herein, it is contemplated that the hook assembly 10 is configured such that the barb 42 may be retracted once, at which point the user may dispose of at least the wire 40, and possibly also the hook body. However, in alternative embodiments, the hook assembly 10 or components thereof may be capable of being reassembled and reused one or more times.

Figure 8:
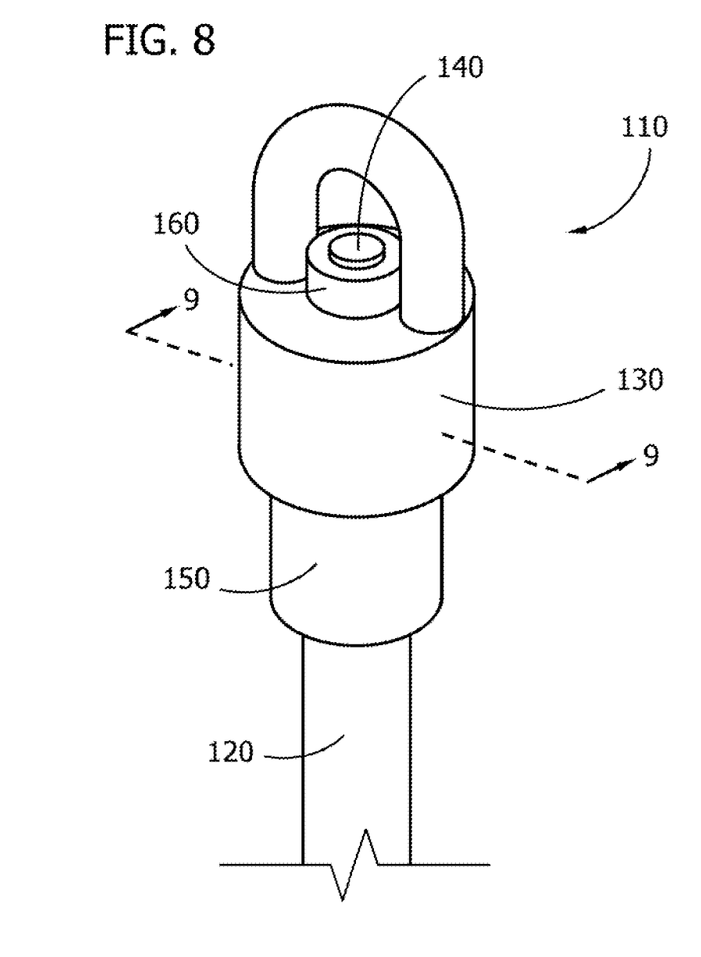
FIG. 8 is a fragmentary perspective of an alternative embodiment of the fish hook assembly.
Figure 9:
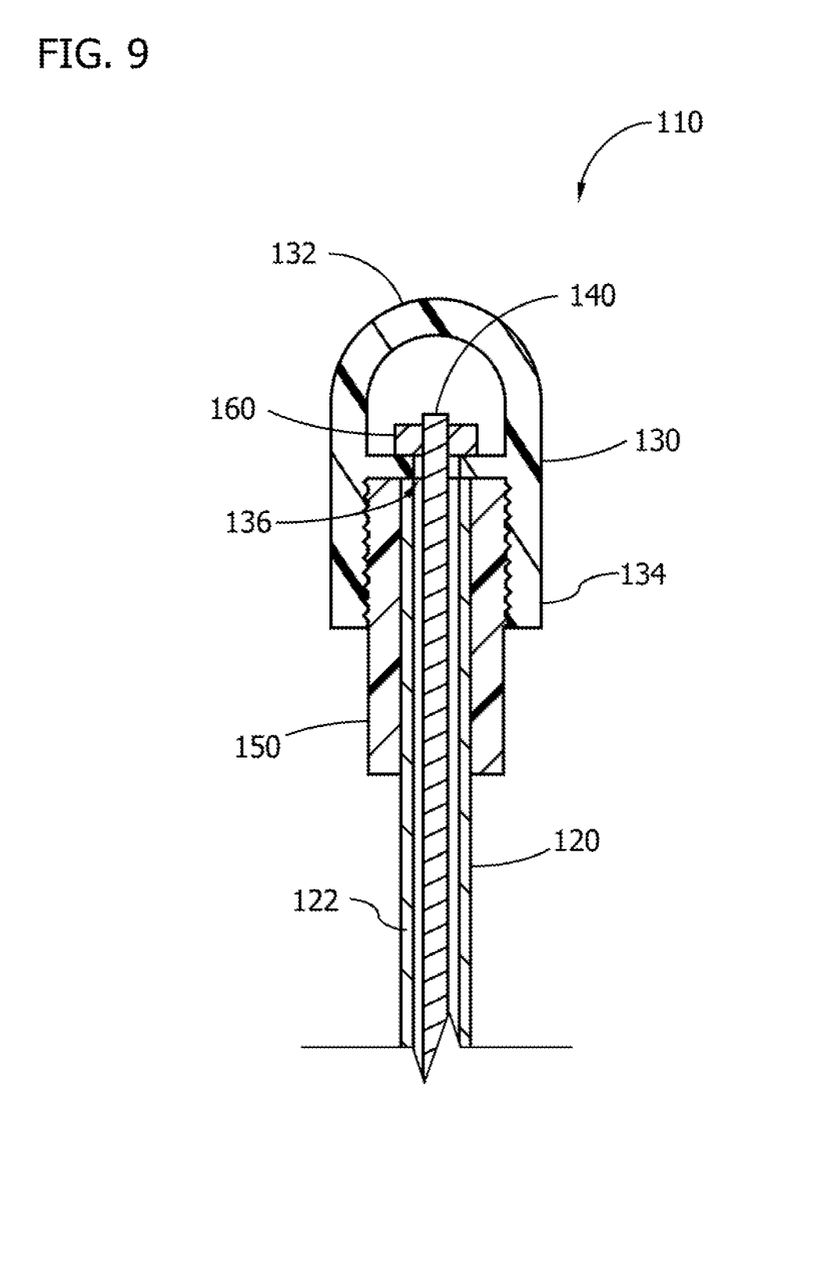
FIG. 9 is a fragmentary section of the fish hook assembly of FIG. 8.

Numerous modifications can be made to the elements of the exemplary fish hook assembly described above without departing from the scope of the invention. As a non-limiting example, the ferrule 36 of the eye bolt 30 may be attached to the base 34 with a swivel connector or another fastener that permits the base 34 and the eye portion 32 to rotate independently. In such a configuration, the eye bolt 30 may be rotated in its fastening and/or unfastening direction without causing substantial rotation in the wire 40, which is retained by the ferrule 36. Referring to FIGS. 8-9, an alternative fish hook assembly indicated generally by reference number 110 includes a hook body 120, an eye nut 130, a wire 140, a threaded collar 150, and a crimp 160. In this embodiment, the collar 150 fits tightly to an upper shank wall 122 of the hook body 120 and functions as a widening extension of the hook body 120 in the upper shank region. The eye nut 130 includes a loop 132 and a threaded lower sheath 134 that threadably engages an upper portion of the collar 150 to secure the eye nut 130 to the fish hook assembly 110. The eye nut also has a central bore 136 that extends through the longitudinal axis of the eye nut so that the wire 140 may be installed. A crimp 160 may secure the proximal end of the wire 140 generally to prevent the wire 140 from moving downward while permitting the relative rotation of the wire 140 and the eye nut 130. This allows the eye nut 130 to travel in its fastening and unfastening directions without causing the wire 140 to rotate internally.

In yet other embodiments, an eye bolt such as eye bolt 30 may accommodate a wire through a central bore rather than with the ferrule 36 as described above in connection with FIG. 5.

It will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A retractable barb fish hook comprising:
   a body comprising a hollow interior, a shank portion defining a shank end with a shank opening, and a hook portion defining a hook end with a barb opening, wherein the hook end defines a fish hook point configured to pierce flesh of a fish to hook the fish; and
   an insert comprising a wire and an eye, the wire having a connecting end and a barb end, the barb end defining a fish hook barb, the eye having a receiving portion and a base, the base being connected to the connecting end of the wire;
   wherein the receiving portion of the eye is configured to rotate with respect to the barb end of the wire;
   wherein the wire extends in the hollow interior of the body such that the barb extends in a direction away from the fish hook point, the fish hook barb being located with respect to the fish hook point to pass through the flesh of the fish after the flesh of the fish is pierced by the fish hook point, and the fish hook barb being configured to obstruct removal of the fish off the fish hook over the fish hook point past the barb; and
   wherein at least a portion of the barb end of the wire is retractable into the interior of the body by moving the eye in an outward direction from the shank opening and exerting a force on the wire that is sufficient to deform the barb.

2. The retractable barb fish hook of claim 1, wherein the base of the eye comprises a rotating connector, the connecting end of the wire being connected to the rotating connector.

3. The retractable barb fish hook of claim 1, wherein the wire comprises a plurality of fibers, the plurality of fibers being configured to twist as the eye is rotated with respect to the barb end of the wire.

4. The retractable barb fish hook of claim 1, wherein the base of the eye and the body of the hook are releasably coupled such that the base of the eye and the body of the hook are selectively disengageable from one another when rotated relative one another in a decoupling direction.

5. The retractable barb fish hook of claim 4, wherein the base of the eye and the shank opening threadably mate.

6. The retractable barb fish hook of claim 4, wherein the base of the eye and an external portion of the shank end threadably mate.

7. A retractable barb fish hook comprising:
   a body comprising a shank portion defining a shank end with a shank opening and a hook portion defining a hook end with a barb opening, the shank end having a threaded portion, wherein the hook end defines a fish hook point; and
   an insert comprising a wire and an eye, the wire having a connecting end and a barb end, the barb end defining a fish hook barb, the eye having a receiving portion and a base, the base being configured to mate threadably with the threaded portion of the body, the wire being coupled to the base portion of the eye and extending in the body such that the fish hook barb extends from the barb opening in a direction away from the fish hook point, the fish hook barb being located with respect to the fish hook point to pass through the flesh of the fish after the flesh of the fish is pierced by the fish hook point, the fish hook barb being configured to obstruct removal of the fish off the fish hook over the fish hook point past the fish hook barb, when the base is threadably coupled to the threaded portion of the body.

8. The retractable barb fish hook of claim 7, wherein the barb is retractable into the barb opening by decoupling the eye and the body and exerting a force on the wire sufficient to deform the barb.

9. The retractable barb fish hook of claim 7, wherein the receiving portion of the eye is configured to rotate with respect to the barb end of the wire.

10. The retractable barb fish hook of claim 9, wherein the insert further comprises a rotating connector coupled to the base of the eye, the wire being connected to the rotating connector.

11. The retractable barb fish hook of claim 9, wherein the wire comprises a plurality of fibers, wherein the plurality of fibers are configured to twist as the eye is rotated with respect to the barb end of the wire.

12. A method of making a retractable barb fish hook, the method comprising the steps of:
    providing an elongate body, an eye, and a flexible wire, the elongate body comprising a shank portion defining a shank end with a shank opening and a distal portion defining a distal end with a barb opening, the eye comprising a receiving portion and a base, the distal end of the elongate body defining a point of the fish hook for piercing flesh of a fish to hook the fish, and the wire comprising a proximal end and a distal end;

connecting the proximal end of the wire to the base of the eye;

inserting the wire through the elongate body such that the distal end of the wire protrudes from the barb opening and the base of the eye is received in the shank opening; and securing the base of the eye to the shank end of the elongate body; and bending a portion of the wire near the distal end of the wire to form a fish hook barb that extends from the barb opening in a direction away from the point so the barb is located to pass through flesh of a fish after the flesh of the fish is pierced by the point, the barb being oriented to obstruct removal of a fish off the fish hook over the point past the fish hook barb.

13. The method of making a retractable barb fish hook of claim 12, further comprising forming an arc in the elongate body such that the shank opening and the barb opening are not coaxial.

\* \* \* \* \*